(12) United States Patent
Nishiguchi et al.

(10) Patent No.: US 8,549,321 B2
(45) Date of Patent: Oct. 1, 2013

(54) IC CHIP, BOARD, INFORMATION PROCESSING EQUIPMENT AND STORAGE MEDIUM

(75) Inventors: Naoki Nishiguchi, Kawasaki (JP); Eiji Hasegawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1477 days.

(21) Appl. No.: 11/355,086

(22) Filed: Feb. 16, 2006

(65) Prior Publication Data

US 2007/0005512 A1 Jan. 4, 2007

(30) Foreign Application Priority Data

Jun. 30, 2005 (JP) .................................. 2005-192630

(51) Int. Cl.
*H04L 29/06* (2006.01)
(52) U.S. Cl.
USPC ........... 713/189; 713/150; 713/168; 713/171; 380/259; 380/280; 380/286; 719/312; 719/313
(58) Field of Classification Search
USPC .................. 713/194, 150, 189; 380/280, 286
See application file for complete search history.

(56) References Cited

U.S. PATENT DOCUMENTS

| | | | |
|---|---|---|---|
| 6,351,813 B1* | 2/2002 | Mooney et al. | 713/185 |
| 2003/0033537 A1* | 2/2003 | Fujimoto et al. | 713/193 |
| 2004/0017916 A1* | 1/2004 | Staddon et al. | 380/277 |
| 2004/0156506 A1* | 8/2004 | Sanchez | 380/277 |
| 2005/0182966 A1* | 8/2005 | Pham et al. | 713/201 |
| 2005/0190912 A1* | 9/2005 | Hopkins et al. | 380/44 |
| 2005/0235141 A1* | 10/2005 | Ibrahim et al. | 713/164 |
| 2005/0265546 A1* | 12/2005 | Suzuki | 380/44 |
| 2006/0080527 A1* | 4/2006 | Novack et al. | 713/156 |
| 2006/0288209 A1* | 12/2006 | Vogler | 713/168 |

FOREIGN PATENT DOCUMENTS

| | | |
|---|---|---|
| JP | 5-347616 | 12/1993 |
| JP | 7-334080 | 12/1995 |
| JP | 2000-107424 | 4/2000 |
| JP | 2001-111539 | 4/2001 |
| JP | 2001-237822 | 8/2001 |

(Continued)

OTHER PUBLICATIONS

Jiang et al., "Secure Communication between Set-top Box and Smart Card in DTV Broadcasting", IEEE Transactions on Consumer Electronics, vol. 50, Jun. 2004, pp. 882-886.*

(Continued)

*Primary Examiner* — Taghi Arani
*Assistant Examiner* — Thaddeus Plecha
(74) *Attorney, Agent, or Firm* — Staas & Halsey LLP (57) ABSTRACT

An IC chip, a board, information processing equipment, and a storage medium are provided that can prevent, even when information is transferred between a plurality of programs, leaking of the right protection algorithm of information in connection with the transfer. A security board is included an IC chip having a secure module. The secure module receives an encryption key request signal, and generates a communication encryption key every time when the encryption key request signal is received, the communication encryption key being used to encrypt information to be transferred between a plurality of programs. The number of times the communication encryption key is supplied is counted. If the counted number is equal to or less than a predetermined number, the communication encryption key is supplied to outside. If the counted number exceeds the predetermined number, the supply of the generated communication encryption key to outside is stopped.

12 Claims, 6 Drawing Sheets

(56) References Cited

FOREIGN PATENT DOCUMENTS

| | | |
|---|---|---|
| JP | 2004-40660 | 2/2004 |
| JP | 2004-80174 | 3/2004 |
| JP | 2004-96666 | 3/2004 |
| WO | WO 03098868 A1 * | 11/2003 |

OTHER PUBLICATIONS

Japanese Office Action issued Apr. 19, 2011 in corresponding Japanese Patent Application 2005-192630.

* cited by examiner

IC CHIP, BOARD, INFORMATION PROCESSING EQUIPMENT AND STORAGE MEDIUM

CROSS-REFERENCE TO RELATED APPLICATIONS

This Nonprovisional application claims priority under 35 U.S.C. §119(a) on Patent Application No. 2005-192630 filed in Japan on Jun. 30, 2005, the entire contents of which are hereby incorporated by reference.

BACKGROUND OF THE INVENTION

The present invention relates to an IC chip, a board, information processing equipment, and a storage medium that are capable of preventing, when data is transferred between a plurality of software programs through a memory, fraudulent use, tampering, and the like by third parties monitoring and analyzing the memory.

In recent years, broadband Internet, digital broadcasting, etc., have become widespread, and right protection techniques for assuring the security of distributed content (mainly digital AV content) have been receiving attention. When distributed content is reproduced through a dedicated receiver, unauthorized copying of the content and the like can be relatively easily prevented. On the other hand, when distributed content is reproduced using an electronic device having an open architecture, such as, in particular, a personal computer (hereinafter referred to as a "PC"), basically, memory analysis can be easily done by third parties, and thus it is difficult to ensure the security of the content. However, the PC is one of the major terminal devices for broadband Internet, and if the security of content can be assured, the potential for distributing digital AV content on the entire Internet will be dramatically improved.

Conventionally, for the right protection of a software program installed on a PC, execution of a secret process for an algorithm to assure security and a make-it-difficult-to-read process for making the analysis of an algorithm difficult are in the mainstream. The former one is, for example, an encryption process using an encryption key, and the latter one is, for example, a process of making the analysis of an arithmetic process difficult by executing a complex process in which the results of arithmetic processing are the same.

BRIEF SUMMARY OF THE INVENTION

The present invention is made in view of the foregoing problems. An object of the present invention is to provide an IC chip, a board, information processing equipment, and a storage medium that are capable of preventing, even when information is transferred between a plurality of programs, leaking of the right protection algorithm of information in connection with the transfer, by generating an encryption key using a separately provided secure module and encrypting information to be stored into a main memory.

Another object of the present invention is to provide an IC chip, a board, information processing equipment, and a storage medium, in which a generation history of an encryption key that is generated using a separately provided secure module is stored in the secure module, whereby even when the encryption key is changed the encryption key can be easily re-obtained by analyzing a past generation history, and the occurrence of a situation where information cannot be decrypted can be prevented in a state in which a high security level is maintained.

To attain the objects mentioned above, in an IC chip according to a first aspect of the present invention having a secure module with a structure that does not allow information stored in the secure module to be obtained from outside, the secure module comprises: a receiving unit that receives an encryption key request signal that is a request for supply of a communication encryption key, from an external CPU that executes a program for transferring information; a generating unit that generates a communication encryption key every time when the encryption key request signal is received, the communication encryption key being used to encrypt information to be transferred between a plurality of programs; a counting unit that counts a number of times the generated communication encryption key is supplied to the external CPU; a determining unit that determines whether the number of times counted by the counting unit exceeds a predetermined number of times; a supplying unit that supplies, if the determining unit determines that the predetermined number of times is not exceeded, the generated communication encryption key to the external CPU that executes a program which sends the encryption key request signal; and a stopping unit that stops, if the determining unit determines that the predetermined number of times is exceeded, supplying the generated communication encryption key to the external CPU.

An IC chip according to a second aspect of the present invention is such that in the first aspect the secure module further comprises: a setting unit that sets the predetermined number of times for each program that is executed by the external CPU.

An IC chip according to a third aspect of the present invention is such that in the first or second aspect the secure module further comprises: a storage unit that stores historical information about generation of the communication encryption key; an extracting unit that extracts a necessary communication encryption key from the historical information; and a supplying unit that supplies the extracted communication encryption key to the external CPU.

A circuit board according to a fourth aspect of the present invention has mounted thereon the IC chip according to one of the first to third aspects.

In information processing equipment according to a fifth aspect of the present invention including: a memory having stored therein information that can be read from outside; and a CPU that executes a program stored into the memory, the information processing equipment transferring information between a plurality of programs stored into the memory, the information processing equipment comprises: the circuit board according to the fourth aspect; an encrypting unit that encrypts information to be transferred, using the supplied communication encryption key; a transmitting and receiving unit that transmits and receives the encrypted information; and a decrypting unit that decrypts the received encrypted information.

Information processing equipment according to a sixth aspect of the present invention is such that in the fifth aspect the secure module further comprises: a setting unit that sets the predetermined number of times for each program that is executed by the external CPU.

Information processing equipment according to a seventh aspect of the present invention is such that in either the fifth or sixth aspect the secure module further comprises: a storage unit that stores historical information about generation of the communication encryption key; an extracting unit that extracts a necessary communication encryption key from the historical information; and a supplying unit that supplies the extracted communication encryption key to the external CPU.

In a storage medium according to an eighth aspect of the present invention having stored therein a computer program that causes a computer to function as a secure module having stored therein information that cannot be obtained from outside, the computer is caused to function as: a receiving unit that receives an encryption key request signal that is a request for supply of a communication encryption key, from an external CPU that executes a computer program for transferring information; a generating unit that generates a communication encryption key every time when the encryption key request signal is received, the communication encryption key being used to encrypt information to be transferred between a plurality of programs; a counting unit that counts a number of times the generated communication encryption key is supplied to the external CPU; a determining unit that determines whether the number of times counted by the counting unit exceeds a predetermined number of times; a supplying unit that supplies, if the determining unit determines that the predetermined number of times is not exceeded, the generated communication encryption key to the external CPU that executes a computer program which sends the encryption key request signal; and a stopping unit that stops, if the determining unit determines that the predetermined number of times is exceeded, supplying the generated communication encryption key to the external CPU.

A storage medium according to a ninth aspect of the present invention is such that in the eighth aspect the computer is caused to further function as: a setting unit that sets the predetermined number of times for each computer program that is executed by the external CPU.

A storage medium according to a tenth aspect of the present invention is such that in either eighth or ninth aspect the computer is caused to further function as: a storage unit that stores historical information about generation of the communication encryption key; an extracting unit that extracts a necessary communication encryption key from the historical information; and a supplying unit that supplies the extracted communication encryption key to the external CPU.

In the first, fourth, fifth, and eighth aspects, in information processing equipment including a security board having being mounted thereon an IC chip having a secure module with a structure that does not allow information stored in the secure module to be obtained from outside, the secure module receives an encryption key request signal that is a request for supply of a communication encryption key, from an external CPU that executes a program for transferring information; and generates a communication encryption key every time when the encryption key request signal is received, the communication encryption key being used to encrypt information to be transferred between a plurality of programs. The number of times the generated communication encryption key is supplied to the external CPU is counted. If it is determined that the counted number of times does not exceed a predetermined number of times, the generated communication encryption key is supplied to the external CPU that executes a program which sends the encryption key request signal. If it is determined that the counted number of times exceeds the predetermined number of times, the supply of the generated communication encryption key to the external CPU is stopped. By this, the secure module having received from a program for transferring information a request to supply a communication encryption key that is used to encrypt information to be transferred, no longer supplies the communication encryption key if the number of times the communication encryption key is supplied exceeds a predetermined number of times. Thus, for example, if it is determined that the number of programs that transfer information to each other is exceeded, because the secure module does not supply the communication encryption key, even if a program that is executed by a third party who has made a request for the communication encryption key to attempt to fraudulently acquire the information acquires the communication encryption key, a program to which the information is transferred cannot acquire a decryption key. Accordingly, the fraudulent acquisition of the information by the third party can be prevented.

In the second, sixth, and ninth aspects, the secure module can set a predetermined number of times for each program that is executed by the external CPU. By this, the index to determine whether to supply a communication encryption key can be changed according to the configuration of a program for transferring information. Thus, when another program by a third party makes a request for the communication encryption key, the supply of information can be effectively prevented.

In the third, seventh, and tenth aspects, the secure module has stored therein historical information about generation of a generated communication encryption key. When the secure module receives from the outside a history request signal that is a request for supply of historical information, the secure module supplies the stored historical information to the sender of the history request signal. By storing historical information about a changed communication encryption key in the secure module having stored therein information that cannot be read from the outside, even if the communication encryption key being used for encryption is not the latest one, a communication encryption key that enables decryption can be easily identified, making it possible to prevent a situation where information cannot be decrypted.

In the first, fourth, fifth, and eighth aspects, in the secure module having received a request for generation of a communication encryption key from a program for transferring information, the communication encryption key being used to encrypt information to be transferred, a unique communication encryption key is generated on every request, and when there is a request for supply of the generated communication encryption key, if the number of times the communication encryption key is supplied exceeds a predetermined number of times, the communication encryption key is no longer supplied. Hence, for example, if it is determined that the number of programs that transfer information to each other is exceeded, because the secure module does not supply the communication encryption key, even if a program that is executed by a third party who has made a request for the communication encryption key to attempt to fraudulently acquire the information acquires the communication encryption key, a program to which the information is transferred cannot acquire a decryption key. Accordingly, the fraudulent acquisition of the information by the third party can be prevented.

In the second, sixth, and ninth aspects, the index to determine whether to supply a communication encryption key can be changed according to the configuration of a program for transferring information. Thus, when another program by a third party makes a request for the communication encryption key, the supply of information can be effectively prevented.

In the third, seventh, and tenth aspects, by storing historical information about a changed communication encryption key in the secure module having stored therein information that cannot be read from the outside, even if the communication encryption key being used for encryption is not the latest one, a communication encryption key that enables decryption can be easily identified, making it possible to prevent a situation where information cannot be decrypted.

The above and further objects and features of the invention will more fully be apparent from the following detailed description with accompanying drawings.

DETAILED DESCRIPTION OF THE INVENTION

As described above, when a software program is executed on a PC, the program is always loaded into a main memory and then executed. Thus, by copying the stored contents of the main memory and analyzing the copied contents, the details of the aforementioned right protection algorithm can be grasped only if there is sufficient time to do so. In addition, if, for example, the stored contents of the main memory are analyzed, and thereby a storage location of an encryption key being used for an encryption process is identified, the right protection algorithm of the software program is leaked.

In view of this, for example, information processing equipment is developed in which a secure module having a structure that does not allow the stored contents to be read/written from the outside is separately provided. The information processing equipment prevents, even if the stored contents of the main memory are analyzed and a storage location of an encryption key being used for an encryption process is identified, the right protection algorithm of the software program from being leaked, by storing the encryption key in the secure module.

By separately providing a secure module, as long as information is processed by a single software program, the possibility that the right protection algorithm may be leaked is very little. However, depending on the application, a plurality of software programs may be simultaneously executed and there may be programs that transfer information to each other. In this case, if the stored contents of the main memory upon the transfer are analyzed, the possibility remains that information having been subjected to an encryption process may be inappropriately taken.

The present invention is made in view of the foregoing problems. An object of the present invention is to provide an IC chip, a board, information processing equipment, and a storage medium that are capable of preventing, even when information is transferred between a plurality of programs, leaking of the right protection algorithm of information in connection with the transfer, by generating an encryption key using a separately provided secure module and encrypting information to be stored into a main memory.

Another object of the present invention is to provide an IC chip, a board, information processing equipment, and a storage medium, in which a generation history of an encryption key that is generated using a separately provided secure module is stored in the secure module, whereby even when the encryption key is changed the encryption key can be easily re-obtained by analyzing a past generation history, and the occurrence of a situation where information cannot be decrypted can be prevented in a state in which a high security level is maintained. The present invention will now be illustrated by the following embodiments.

First Embodiment

Figure 1:
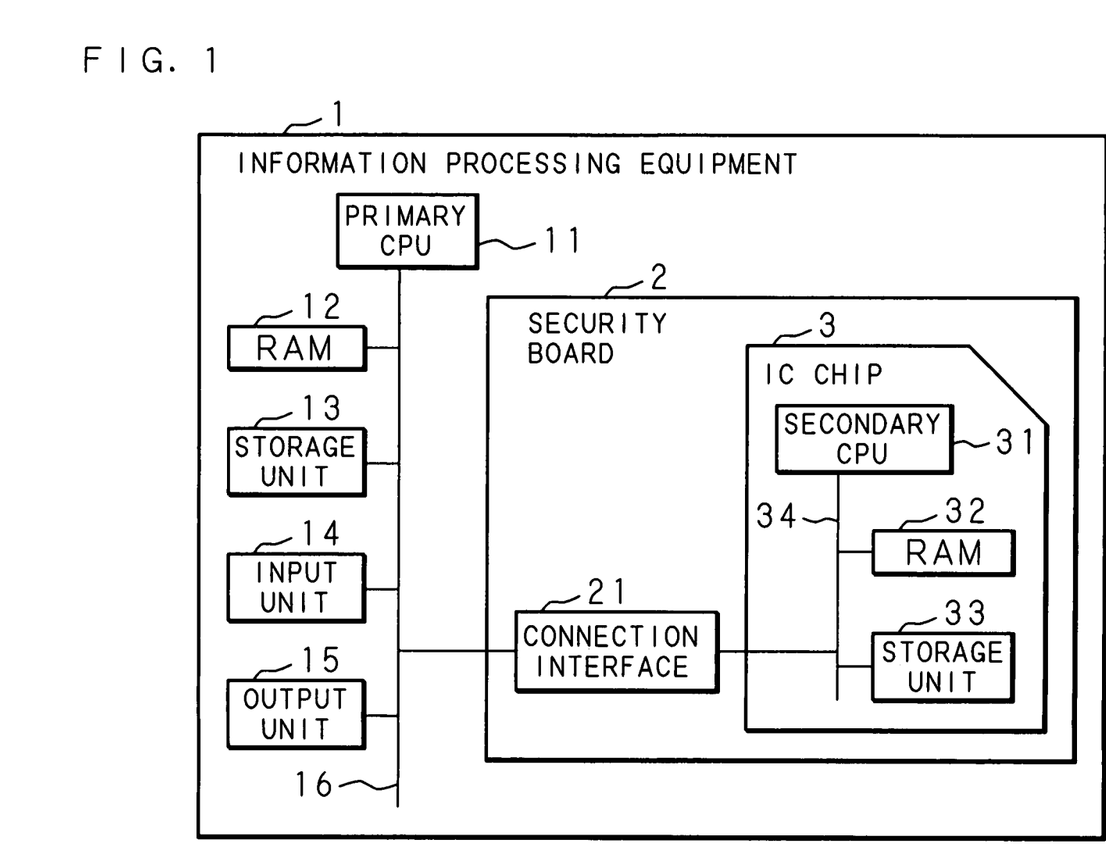
FIG. 1 is a block diagram showing a configuration of information processing equipment according to a first embodiment of the present invention.

FIG. 1 is a block diagram showing a configuration of information processing equipment according to a first embodiment of the present invention. In the information processing equipment according to the first embodiment, a security board 2 for maintaining security is connected to an arithmetic processing unit including a primary CPU 11 as the main component. The security board 2 is connected to the arithmetic processing unit through an internal bus 16 and a connection interface 21, and has an IC chip 3 mounted thereon. The information processing equipment 1 includes at least the primary CPU 11, RAM 12, a storage unit 13, an input unit 14, an output unit 15, and the security board 2. The components are connected to one another through the internal bus 16.

The primary CPU 11 is connected through the internal bus 16 to each of the hardware components, such as those described above, of the information processing equipment 1. The primary CPU 11 controls the aforementioned hardware components, and allows programs, such as a program for receiving digital content, a program for encrypting/decrypting the received digital content, and a program for transferring data between a plurality of programs, which are stored in the storage unit 13 such as a hard disk, to be loaded into the RAM 12, thereby executing various software functions.

The RAM 12 is composed of DRAM or the like. In the RAM 12, a program stored in the storage unit 13, such as a program for receiving digital content, a program for encrypting/decrypting the received digital content, or a program for transferring data between a plurality of programs, is loaded upon its execution, and temporary data generated upon execution is stored.

The input unit 14 is an input medium necessary to operate the information processing equipment 1, such as a keyboard having character keys, a numeric keypad, various function keys, and the like, or a mouse. The output unit 15 is, for example, a display device such as a liquid crystal display device or a CRT display, or a printing device such as a laser printer or a dot printer.

The security board 2 includes at least the connection interface 21 connected to the primary CPU 11 through the internal bus 16; and the IC chip 3. The IC chip 3 is configured as a secure module having a structure that does not allow information stored in the secure module to be read/written from the outside. The IC chip 3 includes at least a secondary CPU 31, RAM 32, and a storage unit 33. The storage unit 33 stores therein, for example, a program for generating, when an encryption key request signal is received, a communication encryption key being used to perform an encryption process on information to be transferred between programs, a program for counting the number of times the generated communication encryption key is supplied, a program for determining according to the counted number of times whether to supply the communication encryption key, and a program for supplying the generated communication encryption key to the sender of the encryption key request signal.

The secondary CPU 31 is connected through an internal bus 34 to each of the hardware components, such as those described above, of the IC chip 3. The secondary CPU 31 controls the aforementioned hardware components, and allows various programs stored in the storage unit 33 to be loaded into the RAM 32, thereby executing various software functions.

The processes performed by the primary CPU 11 and the secondary CPU 31 in the information processing equipment 1 having the aforementioned configuration will be described below. The first embodiment explains the transfer of digital content between a plurality of programs. Note that in the first embodiment the authenticity of a program to be executed is assured by other means.

Figure 2:
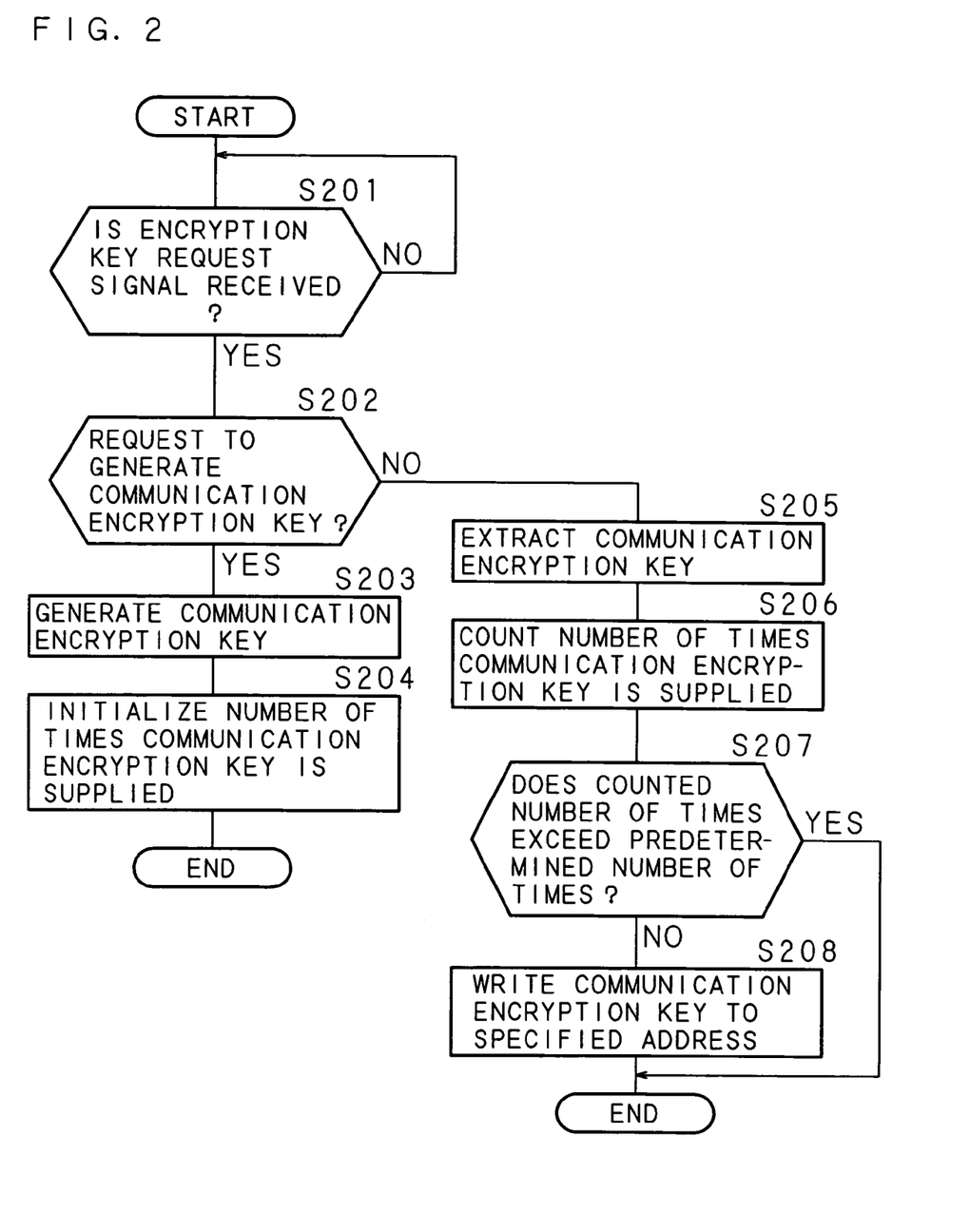
FIG. 2 is a flowchart showing process steps performed by a secondary CPU on an IC chip according to the first embodiment of the present invention.

FIG. 2 is a flowchart showing process steps performed by the secondary CPU 31 on the IC chip 3 according to the first embodiment of the present invention. When digital content is transferred between a plurality of programs, the primary CPU 11 of the information processing equipment 1 sends an encryption key request signal to the IC chip 3 in response to an instruction from a program that is the sender of the digital content. The secondary CPU 31 on the IC chip 3 receives the encryption key request signal ("YES" at step S201).

Note that the timing at which the primary CPU 11 of the information processing equipment 1 sends an encryption key request signal to the IC chip 3 in response to an instruction from a program that is the sender of the digital content is not limited to the one described above in which an encryption key request signal is sent every time when digital content is transferred; an encryption key request signal may be sent at a certain interval. Note also that an encryption key request signal may be part of a process command.

Figure 3:
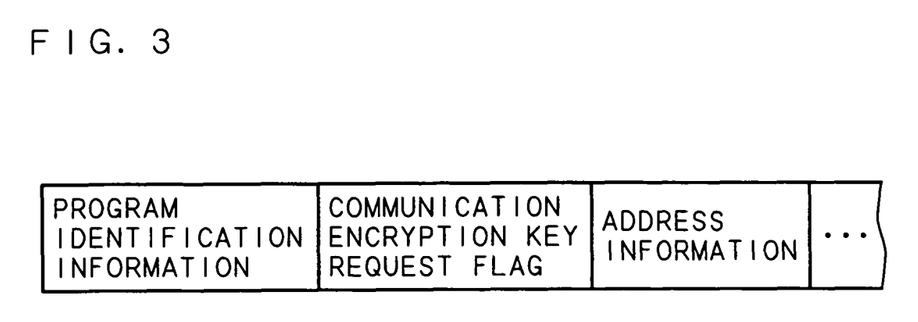
FIG. 3 is an exemplary diagram showing a data configuration of an encryption key request signal.

FIG. 3 is an exemplary diagram showing a data configuration of an encryption key request signal. An encryption key request signal contains at least information identifying a program; information indicating a request for a communication encryption key; and address information about where to store the communication encryption key into the RAM 12. The information identifying a program may be a program ID or may be an address range in the RAM 12 where the program is loaded. The information indicating a request for a communication encryption key is sent with a request flag being set to "1", for example. A communication encryption key may be sent as a reply to an encryption key request signal received through the connection interface 21, instead of being stored into the RAM 12.

The secondary CPU 31 having received the encryption key request signal determines whether the encryption key request signal is a request to generate a communication encryption key (step S202). If the secondary CPU 31 determines that the encryption key request signal is a request to generate a communication encryption key ("YES" at step S202), the secondary CPU 31 determines that a communication encryption key has not been generated, i.e., the transfer of digital content between programs has not been performed, and generates a communication encryption key (step S203). The secondary CPU 31 stores the communication encryption key in the storage means 33 on the IC chip 3, and initializes the number of times a generated communication encryption key is supplied (step S204). The initialization of the number of times a communication encryption key is supplied may be performed by a method in which the number of remaining times is set, or by a method in which the number of times a communication encryption key is supplied is set to 0 (zero).

In order to acquire the generated communication encryption key, the primary CPU 11 of the information processing equipment 1 sends an encryption key request signal to the IC chip 3.

The secondary CPU 31 on the IC chip 3 receives the encryption key request signal (step S201), and determines whether the received encryption key request signal is a request to generate a communication encryption key (step S202). If the secondary CPU 31 determines that the encryption key request signal is not a request to generate a communication encryption key ("NO" at step S202), the secondary CPU 31 determines that a communication encryption key has already been generated, and extracts the communication encryption key by referring to the storage unit 33 (step S205).

The secondary CPU 31 counts the number of times the communication encryption key is supplied every time when the communication encryption key is supplied (step S206). The secondary CPU 31 determines whether the counted number of times exceeds a predetermined number of times (step S207).

The predetermined number of times is inputted through the input unit 14 of the information processing equipment 1, and stored in the RAM 32 through the connection interface 21. For example, the number of programs that transfer digital content to each other may be specified. By this, when an encryption key request signal is received from a fraudulent program by a third party, a program that is originally intended to acquire the communication encryption key cannot receive the communication encryption key.

If the secondary CPU 31 determines that the counted number of times exceeds the predetermined number of times, for example, two ("YES" at step S207), the secondary CPU 31 completes processing without storing the generated communication encryption key to an address in the RAM 12 specified by the encryption key request signal. If the counted number of times exceeds the predetermined number of times, the IC chip 3 may be configured to not receive any subsequent encryption key request signals. If the secondary CPU 31 determines that the counted number of times does not exceed the predetermined number of times ("NO" at step S207), the secondary CPU 31 writes the generated communication encryption key to the address in the RAM 12 specified by the encryption key request signal (step S208). The primary CPU 11 of the information processing equipment 1 monitors whether the communication encryption key is written to the specified address. If the primary CPU 11 determines that the communication encryption key is written to the specified address, the primary CPU 11 performs an encryption process on the digital content using the stored communication encryption key. Note that a communication encryption key generation and a communication encryption key request may be performed at the same time.

The primary CPU 11 transfers the encrypted digital content to another program and sends, in response to an instruction from the another program, an encryption key request signal to the IC chip 3. The secondary CPU 31 performs the same process as that described above, and stores the generated communication encryption key to an address in the RAM 12 specified by the encryption key request signal. The primary CPU 11 of the information processing equipment 1 monitors whether the communication encryption key is stored to the specified address. If the primary CPU 11 determines that the communication encryption key is stored to the specified address, the primary CPU 11 performs a decryption process on received digital content using the stored communication encryption key. If another encryption key request signal is sent to the IC chip 3, since the predetermined number of times, when it is set to two, is exceeded, the communication encryption key cannot be supplied.

As described above, according to the first embodiment, the process of generating a communication encryption key is performed within the IC chip 3 having stored therein information that cannot be read/written from the outside, and an encryption process and a decryption process are performed within a program execution area that is protected by a conventional technique, and therefore, even when digital content is transferred between programs, it is difficult to identify the communication encryption key being used upon the transfer. In addition, even if a fraudulent communication encryption key acquisition request is made by a third party, a program for transferring digital content cannot receive a communication encryption key and the transmission of digital content itself is stopped, and thus, the illegal leaking of the digital content can be surely prevented.

Figure 4:
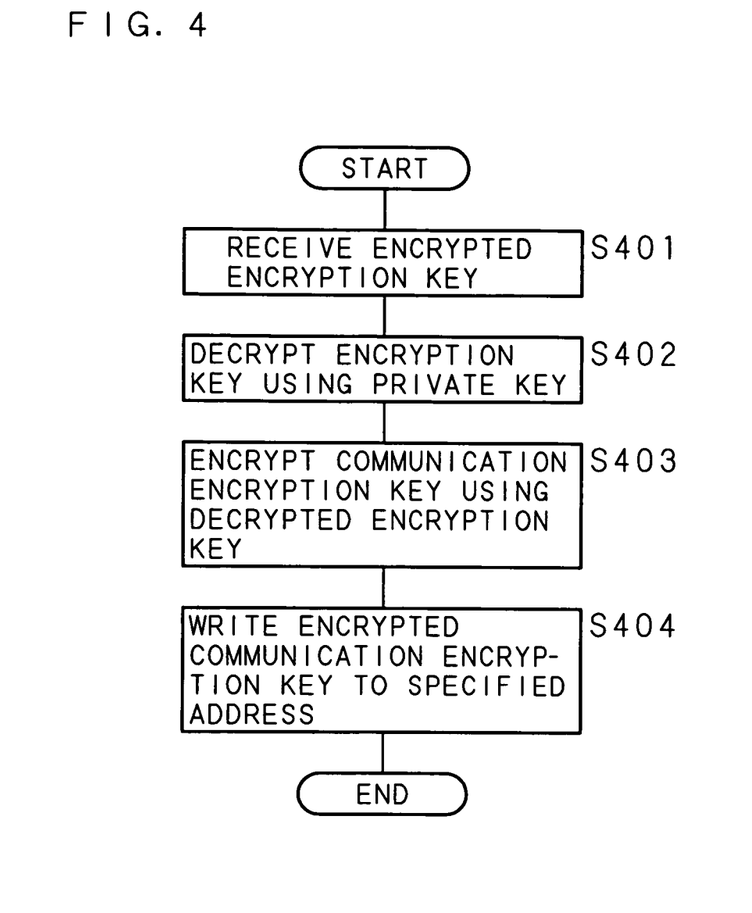
FIG. 4 is a flowchart showing process steps performed by the secondary CPU on the IC chip to encrypt a communication encryption key.

A communication encryption key itself may be encrypted using another encryption key. FIG. 4 is a flowchart showing process steps performed by the secondary CPU 31 on the IC chip 3 to encrypt a communication encryption key. FIG. 4 explains the encryption of a communication encryption key using a public-key system. Needless to say, the encryption is not limited to the public-key system and a private-key system may be used.

The RAM 32 on the IC chip 3 has stored therein a private key corresponding to a public key. The primary CPU 11 of the information processing equipment 1 encrypts, using a public key, an encryption key being used to encrypt a communication encryption key, and sends the encrypted encryption key to the IC chip 3 along with an encryption key request signal.

The secondary CPU 31 receives the encryption key request signal and the encrypted encryption key (step S401), and decrypts the received encryption key using the private key stored in the RAM 32 (step S402). The secondary CPU 31 encrypts, using the decrypted encryption key, a generated communication encryption key (step S403), and writes the encrypted communication encryption key to a specified address in the RAM 12 (step S404).

The primary CPU 11 determining that the communication encryption key is written to the specified address in the RAM 12 decrypts the encrypted communication encryption key using a known encryption key. Then, using the decrypted communication encryption key, the primary CPU 11 encrypts/decrypts received digital content.

By doing so, a communication encryption key can be transferred more securely between a plurality of programs that transfer digital content to each other, and the illegal leaking of content can be more effectively prevented.

Second Embodiment

Figure 5:
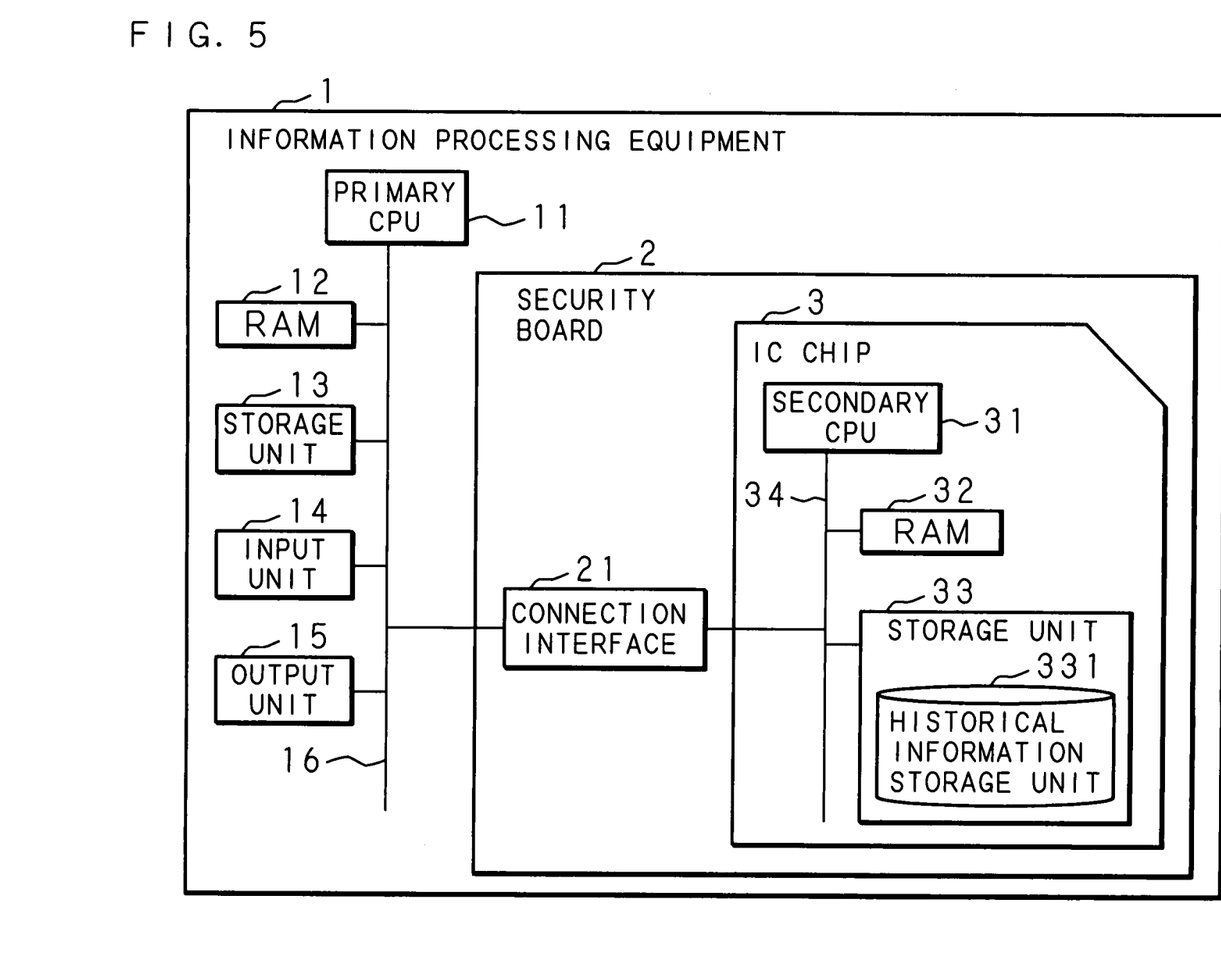
FIG. 5 is a block diagram showing a configuration of information processing equipment according to a second embodiment of the present invention.

FIG. 5 is a block diagram showing a configuration of information processing equipment according to a second embodiment of the present invention. As in the first embodiment, in the information processing equipment according to the second embodiment, a security board 2 for maintaining security is connected to an arithmetic processing unit including a primary CPU 11 as the main component. The security board 2 is connected to the arithmetic processing unit through an internal bus 16 and a connection interface 21, and has an IC chip 3 mounted thereon. The information processing equipment 1 includes at least the primary CPU 11, RAM 12, a storage unit 13, an input unit 14, an output unit 15, and the security board 2. The components are connected to one another through the internal bus 16.

The security board 2 includes at least the connection interface 21 connected to the primary CPU 11 through the internal bus 16; and the IC chip 3. The IC chip 3 is configured as a secure module having a structure that does not allow information stored in the secure module to be read/written from the outside. The IC chip 3 includes at least a secondary CPU 31, RAM 32, and a storage unit 33. The storage unit 33 stores therein, for example, a program for generating, when an encryption key request signal is received, a communication encryption key being used to perform an encryption process on information to be transferred between programs, a program for counting the number of times the generated communication encryption key is supplied, a program for determining according to the counted number of times whether to supply the communication encryption key, and a program for supplying the generated communication encryption key to the sender of the encryption key request signal. In addition, a generated communication encryption key is stored in a historical information storage unit 331 in the storage unit 33 so as to be associated with information that identifies the generated communication encryption key, for example, a communication encryption key number.

The secondary CPU 31 is connected through an internal bus 34 to each of the hardware components, such as those described above, of the IC chip 3. The secondary CPU 31 controls the aforementioned hardware components, and allows various programs stored in the storage unit 33 to be loaded into the RAM 32, thereby executing various software functions.

The processes performed by the primary CPU 11 and the secondary CPU 31 in the information processing equipment 1 having the aforementioned configuration will be described below. The second embodiment explains the transfer of digital content between a plurality of programs. Note that it is assumed in the second embodiment that the authenticity of a program to be executed is assured by other means.

Figure 6:
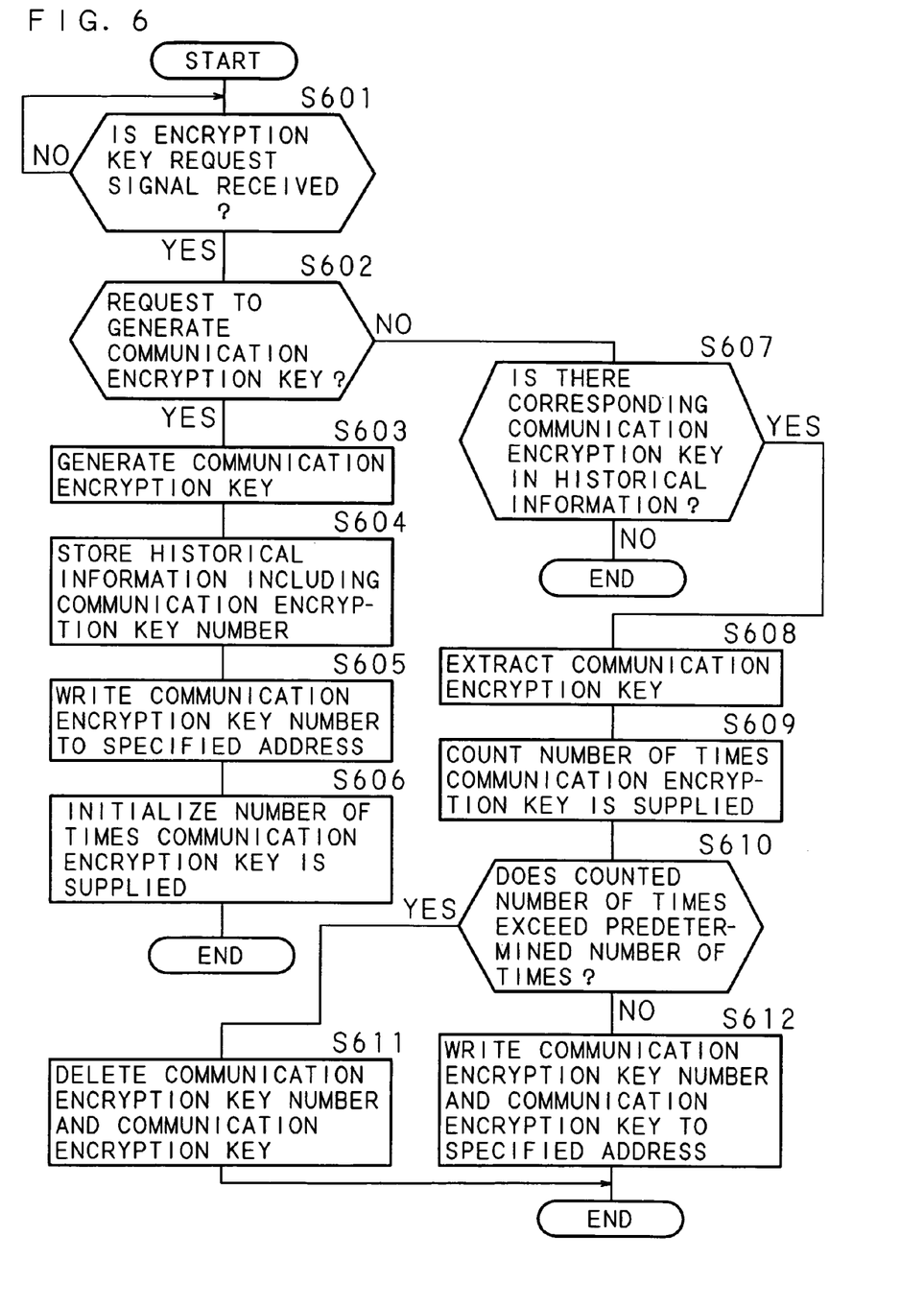
FIG. 6 is a flowchart showing process steps performed by a secondary CPU on an IC chip according to the second embodiment of the present invention.

FIG. 6 is a flowchart showing process steps performed by the secondary CPU 31 on the IC chip 3 according to the second embodiment of the present invention. When digital content is transferred between a plurality of programs, the primary CPU 11 of the information processing equipment 1 sends an encryption key request signal to the IC chip 3 in response to an instruction from a program that is the sender of the digital content. The secondary CPU 31 on the IC chip 3 receives the encryption key request signal ("YES" at step S601).

Note that the timing at which the primary CPU 11 of the information processing equipment 1 sends an encryption key request signal to the IC chip 3 in response to an instruction from a program that is the sender of the digital content is not limited to the one described above in which an encryption key request signal is sent every time when digital content is transferred; an encryption key request signal may be sent at a certain interval. Note also that an encryption key request signal may be part of a process command. The data configuration of an encryption key request signal is the same as that in the first embodiment.

The secondary CPU 31 having received the encryption key request signal determines whether the encryption key request signal is a request to generate a communication encryption key (step S602). If the secondary CPU 31 determines that the encryption key request signal is a request to generate a communication encryption key ("YES" at step S602), the secondary CPU 31 determines that a communication encryption key has not been generated, i.e., the transfer of digital content between programs has not been performed, and generates a communication encryption key (step S603). The secondary CPU 31 assigns a communication encryption key number to the communication encryption key and stores in the storage unit 33 on the IC chip 3 the communication encryption key number in association with the communication encryption key. In addition, the secondary CPU 31 stores in the historical information storage unit 331 on the IC chip 3 the communication encryption key and the communication encryption key number as historical information (step S604). The secondary CPU 31 writes the communication encryption key number to an address in the RAM 12 specified by the encryption key request signal (step S605). Further, the secondary CPU 31 initializes the number of times a generated communication encryption key is supplied (step S606), and stores in the historical information storage unit 331 the communication encryption key in association with the communication encryption key number. The initialization of the number of times a communication encryption key is supplied may be performed by a method in which the number of remaining times is set, or by a method in which the number of times a communication encryption key is supplied is set to 0 (zero).

The primary CPU 11 of the information processing equipment 1 monitors whether the communication encryption key number is stored to the specified address. If the primary CPU 11 determines that the communication encryption key number is stored to the specified address, the primary CPU 11 sends an encryption key request signal to the IC chip 3 in order to acquire the generated communication encryption key. The primary CPU 11 sends the encryption key request signal with the communication encryption key number contained therein.

The secondary CPU 31 on the IC chip 3 receives the encryption key request signal (step S601), and determines whether the received encryption key request signal is a request to generate a communication encryption key (step S602). If the secondary CPU 31 determines that the encryption key request signal is not a request to generate a communication encryption key ("NO" at step S602), the secondary CPU 31 determines that a communication encryption key has already been generated, and determines whether a communication encryption key corresponding to the communication encryption key number is stored in the historical information storage unit 331 (step S607).

If the secondary CPU 31 determines that the communication encryption key corresponding to the communication encryption key number is stored in the historical information storage unit 331 ("YES" at step S607), the secondary CPU 31 extracts the corresponding communication encryption key (step S608). If the secondary CPU 31 determines that there is no communication encryption key corresponding to the communication encryption key number ("NO" at step S607), the secondary CPU 31 determines that there is no corresponding communication encryption key, and completes processing.

The secondary CPU 31 counts the number of times the communication encryption key is supplied every time when the communication encryption key is supplied (step S609). The secondary CPU 31 determines whether the counted number of times exceeds a predetermined number of times (step S610). The counting of the number of times the communication encryption key is supplied is performed for each communication encryption key number. Even if there is a communication encryption key acquisition request from the historical information, if the number of times the communication encryption key is supplied in the past already exceeds the predetermined number of times, the communication encryption key cannot be supplied.

The predetermined number of times is inputted through the input unit 14 of the information processing equipment 1, and stored in the RAM 32 through the connection interface 21. For example, the number of programs that transfer digital content to each other may be specified. By this, when an encryption key request signal is received from a fraudulent program by a third party, a program that is originally intended to acquire the communication encryption key cannot receive the communication encryption key.

If the secondary CPU 31 determines that the counted number of times exceeds the predetermined number of times, for example, two ("YES" at step S610), the secondary CPU 31 deletes the communication encryption key number and communication encryption key stored in the historical information storage unit 331 on the IC chip 3 (step S611), and completes processing without storing the generated communication encryption key and the communication encryption key number to an address in the RAM 12 specified by the encryption key request signal. If it is determined that the counted number of times exceeds the predetermined number of times, the IC chip 3 may be configured to not receive any subsequent encryption key request signals, other than to delete the communication encryption key corresponding to the communication encryption key number from the historical information storage unit 331. If the secondary CPU 31 determines that the counted number of times does not exceed the predetermined number of times ("NO" at step S610), the secondary CPU 31 writes the generated communication encryption key and the communication encryption key number to the address in the RAM 12 specified by the encryption key request signal (step S612).

The primary CPU 11 of the information processing equipment 1 monitors whether the communication encryption key is written to the specified address. If the primary CPU 11 determines that the communication encryption key is written to the specified address, the primary CPU 11 performs an encryption process on digital content to be transferred, using the stored communication encryption key. Note that a communication encryption key generation and a communication encryption key request may be performed at the same time. The primary CPU 11 transfers the encrypted digital content to another program and sends, in response to an instruction from the another program, an encryption key request signal to the IC chip 3. The primary CPU 11 sends the encryption key request signal with a communication encryption key number contained therein.

The secondary CPU 31 performs the same process as that described above and extracts a corresponding communication encryption key (step S608), and stores the extracted communication encryption key and communication encryption key number as a decryption key (the same key is used in the private-key system) for the encrypted digital content, to an address in the RAM 12 specified by the encryption key request signal (step S612). The primary CPU 11 of the information processing equipment 1 monitors whether the communication encryption key is stored to the specified address. If the primary CPU 11 determines that the communication encryption key is stored to the specified address, the primary CPU 11 performs a decryption process on received digital content using the stored communication encryption key. If another encryption key request signal is sent to the IC chip 3, since the predetermined number of times, when it is set to two, is exceeded, the communication encryption key cannot be supplied.

As described above, according to the second embodiment, when digital content is transferred between programs, even if, after digital content to be transferred is encrypted using a communication encryption key, the communication encryption key is newly generated, the communication encryption key (decryption key) generated in the past can be surely acquired based on historical information, making it possible to prevent the occurrence of a situation, for example, where encrypted digital content cannot be decrypted.

As in the first embodiment, a communication encryption key itself may be encrypted using another encryption key; in this case too, the same advantageous effects can be expected.

Although the first and second embodiments explain the storing of a communication encryption key into the RAM 12 of the information processing equipment 1 in response to an instruction from the secondary CPU 31 of a secure module, the present invention is not limited to the configurations according to the first and second embodiments. Any method can be used as long as the method enables the transfer of a communication encryption key while ensuring security; for example, a communication encryption key may be transmitted and received between CPUs. Although the foregoing embodiments explain the configuration with the IC chip 3 handling a single communication encryption key, the IC chip 3 can manage a plurality of communication encryption keys.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An IC chip including a first processor and a storage unit that stores a first program, the first program causing the first processor to execute a procedure, the procedure comprising:
    receiving, from a second processor that executes second programs, an encryption key request signal requesting a communication encryption key to be supplied, the communication encryption key being used to encrypt information to be transferred between the second programs executed on the second processor, the IC chip not including the second processor;
    generating a communication encryption key every time when the encryption key request signal is received;
    counting a number of times when the generated communication encryption key is supplied to the second processor;
    supplying, if the number of times counted does not exceed a predetermined number of times, the generated communication encryption key to the second processor that executes the second programs which send the encryption key request signal; and
    stopping supply of, if the number of times counted exceeds the predetermined number of times, the generated communication encryption key to the second processor that executes the second programs which send the encryption key request signal, and
    wherein the second processor specifies an address in a storage of the second processor to which the communication encryption key is to be written, and adds the specified address information to the encryption key request signal to be transmitted to the IC chip,
    the communication encryption key is written to the address specified when conditions of the number of times are met, and
    the second processor monitors whether the communication encryption key is written to the address specified and encrypts the information using the communication encryption key when the communication encryption key is written.

2. The IC chip according to claim 1, wherein
    the storage unit stores historical information about generation of the communication encryption key;
    the first processor extracts a necessary communication encryption key from the historical information; and
    the extracted communication encryption key is supplied to the second processor that executes a program which sends the encryption key request signal.

3. A method of configuring an IC chip including a first processor and a storage unit that stores a first program to execute:
    receiving, from a second processor that executes second programs, an encryption key request signal requesting a communication encryption key to be supplied, the communication encryption key being used to encrypt information to be transferred between the second programs executed on the second processor, the IC chip not including the second processor;
    generating a communication encryption key every time when the encryption key request signal is received;
    counting a number of times when the generated communication encryption key is supplied to the second processor;
    supplying, if the number of times counted does not exceed a predetermined number of times, the generated communication encryption key to the second processor that executes the second programs which send the encryption key request signal; and
    stopping supply of, if the number of times counted exceeds the predetermined number of times, the generated communication encryption key to second processor that executes the second programs which send the encryption key request signal, and
    wherein the second processor specifies an address in a storage of the second processor to which the communication encryption key is to be written, and adds the specified address information to the encryption key request signal to be transmitted to the IC chip,
    the communication encryption key is written to the address specified when conditions of the number of times are met, and
    the second processor monitors whether the communication encryption key is written to the address specified and encrypts the information using the communication encryption key when the communication encryption key is written.

4. The method according to claim 3, further comprising:
    storing historical information about generation of the communication encryption key;
    extracting a necessary communication encryption key from the historical information; and
    supplying the extracted communication encryption key to the second processor that executes the one program which has sent the encryption key request signal.

5. A circuit board on which is mounted the IC chip according to claim 1.

6. Information processing equipment including:
    a circuit board on which is mounted the IC chip according to claim 1;
    a memory; and
    a CPU as the second processor that executes the second programs stored into the memory,
    the information processing equipment transferring the information between the second programs stored into the memory, and comprising:
    an encrypter to encrypt the information to be transferred, using the supplied communication encryption key;

a transceiver to transmit and receive the encrypted information; and a decrypter to decrypt the received encrypted information.

7. The information processing equipment according to claim 6, wherein:

historical information about generation of the communication encryption key is stored;

a necessary communication encryption key is extracted from the historical information; and the extracted communication encryption key is supplied to the second processor that executes a program which sends the encryption key request signal.

8. The method according to claim 3, wherein the IC chip is mounted on a circuit board.

9. The method according to claim 8, wherein the circuit board is provided in an information processing equipment including:

a memory; and a CPU as the second processor that executes the second programs stored into the memory, the information processing equipment transferring information between the second programs stored into the memory, encrypting the information to be transferred, using the supplied communication encryption key, transmitting and receiving the encrypted information, and decrypting the received encrypted information.

10. The method according to claim 9, further comprising:

storing historical information about generation of the communication encryption key;

extracting a necessary communication encryption key from the historical information; and supplying the extracted communication encryption key to the second processor that executes a program which sends the encryption key request signal.

11. A non-transitory computer-readable storage medium storing a computer program for a computer which causes the computer to perform:

receiving, from a second processor that executes second programs, an encryption key request signal requesting a communication encryption key to be supplied, the communication encryption key being used to encrypt information to be transferred between the second programs executed on the second processor, the IC chip not including the second processor;

generating a communication encryption key every time when the encryption key request signal is received;

counting a number of times the generated communication encryption key is supplied to the second processor;

supplying, if the number of times counted does not exceed a predetermined number of times, the generated communication encryption key to the second processor that executes the second computer programs which send the encryption key request signal; and stopping supply of, if the number of times counted exceeds the predetermined number of times, the generated communication encryption key to the second processor that executes the second programs which send the encryption key request signal, and wherein the second processor specifies an address in a storage of the second processor to which the communication encryption key is to be written, and adds the specified address information to the encryption key request signal to be transmitted to the IC chip, the communication encryption key is written to the address specified when conditions of the number of times are met, and the second processor monitors whether the communication encryption key is written to the address specified and encrypts the information using the communication encryption key when the communication encryption key is written.

12. The storage medium according to claim 11, wherein the computer further performs:

storing historical information about generation of the communication encryption key;

extracting a necessary communication encryption key from the historical information; and supplying the extracted communication encryption key to second processor.

* * * * *